3,163,678
PROCESS FOR THE PRODUCTION OF MONOCHLORACETALDEHYDE
Waldemar Gunther, Marl, Kreis Recklinghausen, Germany, assignor to Chemische Werke Hüls Aktiengesellschaft, Marl, Kreis Recklinghausen, Germany
No Drawing. Filed Mar. 21, 1962, Ser. No. 181,474
Claims priority, application Germany, June 20, 1961, C 24,410
3 Claims. (Cl. 260—601)

This invention relates to a novel method of preparing monochloracetaldehyde.

It is known in the prior art that monochloracetaldehyde can be produced by the chlorination of acetaldehyde. Employing such a process, however, results in the production of a mixture of chlorine-substituted acetaldehydes. The prior art also teaches that monochloracetaldehyde may be prepared by the reaction of vinyl chloride with hypochlorous acid. Such a process involves the production of the respective aldehyde hydrates which are difficult to convert into the pure monochloracetaldehyde.

It is a principal object of the present invention to provide an improved method of preparing monochloracetaldehyde in good yield.

Another object is to provide a novel process for the preparation of monochloracetaldehyde which is simple and economical to carry out.

These and other objects and advantages will become apparent from the following specification and appended claims.

In accordance with the present invention, it has been found that monochloracetaldehyde can be produced in excellent yield by a relatively simple process, and which avoids the problems heretofore encountered when employing the prior known processes. My novel process consists in thermally decomposing monochlorethylene carbonate and recovering the monochloracetaldehyde formed. In carrying out the process, liquid monochlorethylene carbonate is heated to a temperature of between about 100 and 250° C. A preferred embodiment of the process comprises carrying out the heating of monochlorethylene carbonate in the presence of a catalyst for example salts of a quaternary nitrogen-containing compound or the like bases.

The monochlorethylene carbonate used in the process may be obtained from any suitable source, or prepared by reacting ethylene oxide with carbon dioxide followed by chlorination of the resultant ethylene carbonate.

Thermal cleavage or destructive decomposition of the monochlorethylene carbonate is preferably effected by heating the same in a suitable reaction vessel, e.g. a distilling flask equipped with a stirrer. The temperature at which thermal decomposition of monochlorethylene carbonate takes place is between 175 and 200° C. In the presence of a catalyst, as aforementioned, the reaction temperature is nearer the lower point and is initiated briskly at about 140° C., and the yield is higher.

Suitable catalysts are salts of quaternary nitrogen-containing bases, for example tetraethylammonium bromide and which is the preferred salt used.

Other quaternary nitrogen-containing salts which may be employed as catalysts are diethylaniline hydrochloride, and
pyridine hydrochloride The amount of catalyst introduced is 0.1 to 0.5% based upon the weight of monochlorethylene carbonate, and the reaction is accomplished under normal atmospheric pressure. It is unnecessary to introduce diluents and the process may be carried out as a batchwise or continuous process, as desired.

During the destructive thermal decomposition of monochlorethylene carbonate, monochloracetaldehyde and carbon dioxide escape at the head of the distillation column, and may be drawn off and recovered without being contaminated with by-products. If desired, the monochloracetaldehyde may be immediately used as a reactant in reactions without further processing. The monochloracetaldehyde may be converted to the alcohol derivative by introduction of alkyl and hydrogen groups by conventional methods, e.g. treatment of the aldehyde with Grignard reagent in dry ether and subsequent hydrolysis. Monochloracetaldehyde may be employed as an intermediate in the carrying out of numerous organic syntheses such as for the production of 2-carboxythiazole.

The following examples better describe how the process of the invention may be carried out but it will be understood that the same are not limitative of the specification and appended claims.

*Example 1*

To 612 grams (5 moles) of monochlorethylene carbonate (boiling point 212° C.) is added 0.5 gram of tetraethylammonium bromide, and the mass is heated to 140° C. in a flask equipped with a distillation column. A mixture of monochloracetaldehyde and carbon dioxide distills off at 70° C. and which is introduced, while being stirred and at a temperature of 40° to 60° C., into 1480 grams (20 moles) of n-butanol which is slightly acidified with hydrochloric acid. Towards the end of the reaction, the temperature is increased to 180° C., and the amount of butanol present increased by 372 grams (94.8% of the theoretical yield of 392.5 grams of chloracetaldehyde). After neutralization of the acetal-containing butanol solution with sodium hydroxide, the water is removed by the use of azeotropic distillation, and excess butanol distilled off, first under normal atmospheric pressure, then under vacuum. The remaining monochloracetaldehyde-dibutylacetal is thereafter distilled over under vacuum of 18 mm. mercury (Hg) and temperature of 117° C. A yield of 955 grams of monochloracetaldehyde-dibutylacetal is recovered which corresponds to a yield of 91.7% of monochloracetaldehyde based upon the monochlorethylene-carbonate employed.

*Example 2*

Two and one-half moles (306 grams) of monochlorethylene carbonate are placed in a reaction vessel, as in Example 1, and heated to a temperature between 175 and 200° C., but without adding a catalyst. The monochloracetaldehyde formed is introduced as aforedescribed into 888 grams (12 moles) of acidified n-butanol. As the thermal decomposition reaction is finished, 168 grams increase in weight of n-butanol is obtained (85.6% of the theoretical yield of 196 grams of chloracetaldehyde). According to the method as set forth in Example 1, 425 grams of pure monochloracetaldehyde-dibutylacetal are obtained, which corresponds to a yield of 81.6% of monochloracetaldehyde based upon the monochlorethylene carbonate employed.

*Example 3*

Two and one-half moles (306 grams) of monochlorethylene carbonate are heated together with 0.3 percent by weight of pyridine hydrochloride as described in Example 1. At 145° C., a brisk reaction occurs. The temperature is then slowly increased to 200° C., and monochloracetaldehyde formed is introduced into acidified n-butanol. As the reaction is finished, 177 grams more increase in weight of butanol is obtained (90.3% of the theoretical yield as described in Example 1), and 457 grams of monochloracetaldehyde-dibutylacetal are obtained which corresponds to a yield of 87.6% of monochloracetaldehyde based upon the monochlorethylene carbonate employed.

The invention will be fully understood by the foregoing description and examples. It will also be obvious that the process is susceptible to modifications in order to adapt it to different conditions and uses, and accordingly it is desired to comprehend such modifications within the purview of the invention and as may fall within the scope of the appended claims.

What is claimed is:

1. A process for the production of monochloracetaldehyde which comprises heating liquid monochlorethylene carbonate to temperatures between 100 and 250° C. to bring about thermal decomposition of the same and release of monochloracetaldehyde, said reaction being conducted in the presence of a catalyst selected from the group consisting of tetraethyl ammonium bromide, diethyl aniline hydrochloride, and pyridine hydrochloride.

2. The process of claim 1, wherein the catalyst is present in an amount of 0.1 to 0.5% by weight of said monochlorethylene carbonate.

3. A process for the production of monochloracetaldehyde, which process comprises heating liquid monochlorethylene carbonate to temperatures between about 175° C. and 250° C. to bring about thermal decomposition of the same and release of monochloracetaldehyde.

References Cited in the file of this patent

Newman et al.: Jour. Amer. Chem. Soc., vol. 75, 1953, pages 1263–64.